(No Model.) 2 Sheets—Sheet 1.

H. L. CAPLES & W. W. LEWIS.
CONDUIT FOR ELECTRICAL CONDUCTORS.

No. 329,887. Patented Nov. 10, 1885.

WITNESSES:
Charles Weber
Henry D. Ashley

INVENTORS
H. L. Caples
and W. W. Lewis
BY J. C. Higdon
ATTORNEY.

(No Model.) 2 Sheets—Sheet 2.

H. L. CAPLES & W. W. LEWIS.
CONDUIT FOR ELECTRICAL CONDUCTORS.

No. 329,887. Patented Nov. 10, 1885.

WITNESSES:
Charles Weber.
Harry D. Ashley

INVENTORS
H. L. Caples and
W. W. Lewis
BY J. C. Higdon
ATTORNEY.

UNITED STATES PATENT OFFICE.

HENRY L. CAPLES AND WILBER W. LEWIS, OF KANSAS CITY, MISSOURI.

CONDUIT FOR ELECTRICAL CONDUCTORS.

SPECIFICATION forming part of Letters Patent No. 329,887, dated November 10, 1885.

Application filed January 21, 1885. Serial No. 153,469. (No model.)

*To all whom it may concern:*

Be it known that we, HENRY L. CAPLES and WILBER W. LEWIS, of Kansas City, Jackson county, Missouri, have invented an Improved System of Surface-Conduits for Electrical Conductors, of which the following is a full, clear, and exact description.

The object of our invention is to provide an improved conduit for the reception of electrical conductors, one that is adapted to occupy the space usually taken up by street-curbstones; and to this end our invention consists in the combination, in a conduit for electrical conductors, of a hollow curb provided with a cover united thereto by means of a rabbet in one side and a lap-joint on the other, a series of projections upon the interior of said curb, and independent removable supports upon such projections, said supports having depressions therein for holding the conductors, as will be more fully described hereinafter.

Like letters represent like parts throughout the drawings.

Figure 1:
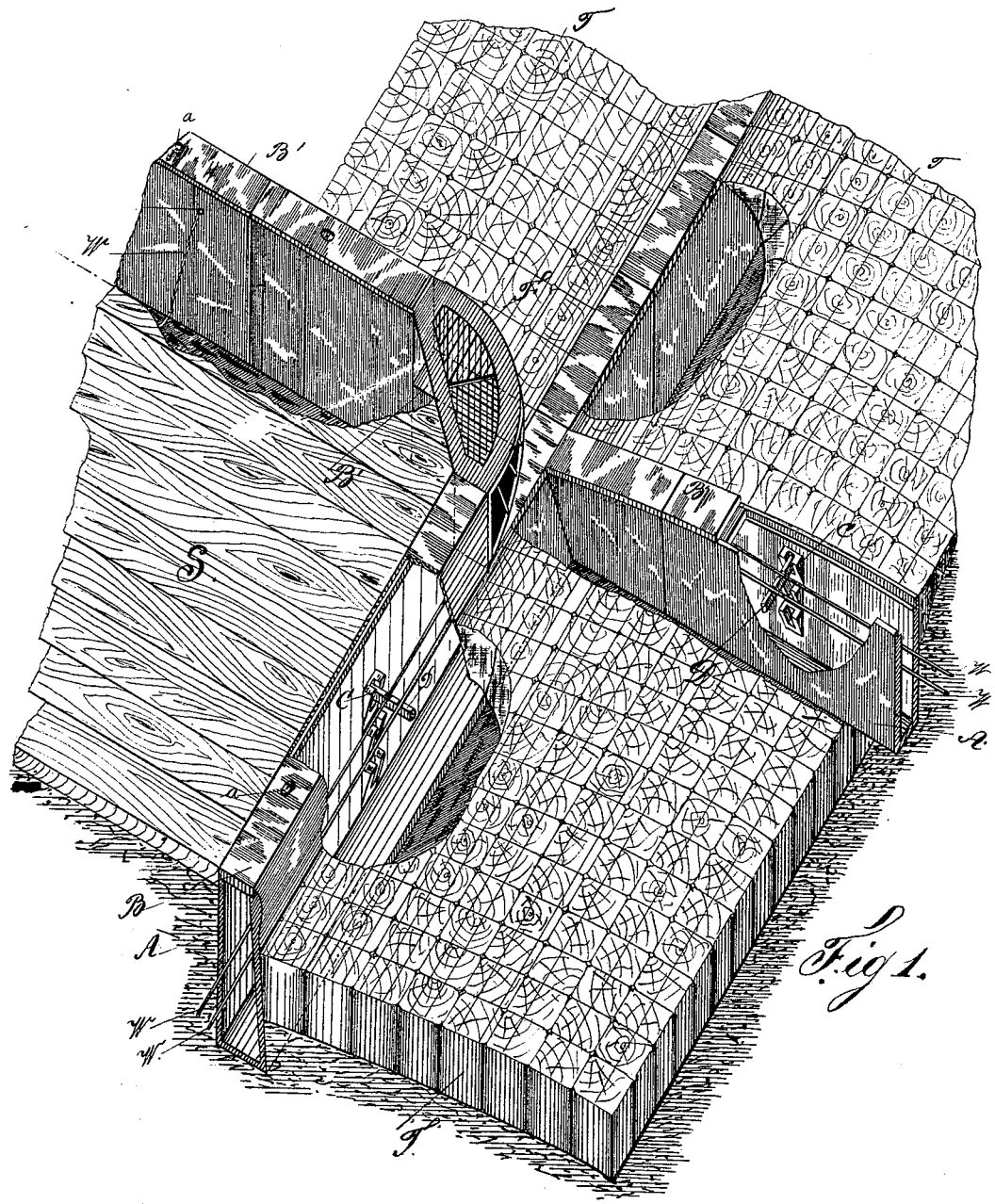
Figures 2, 3, 4:
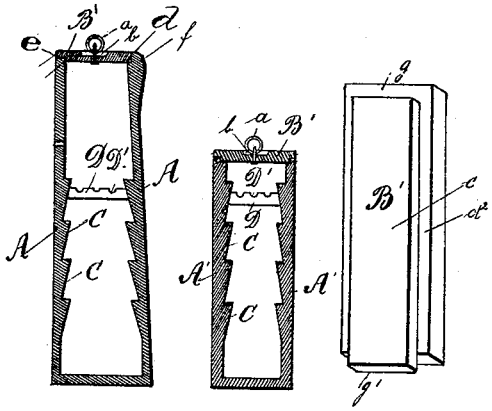
Figures 5, 6, 7:
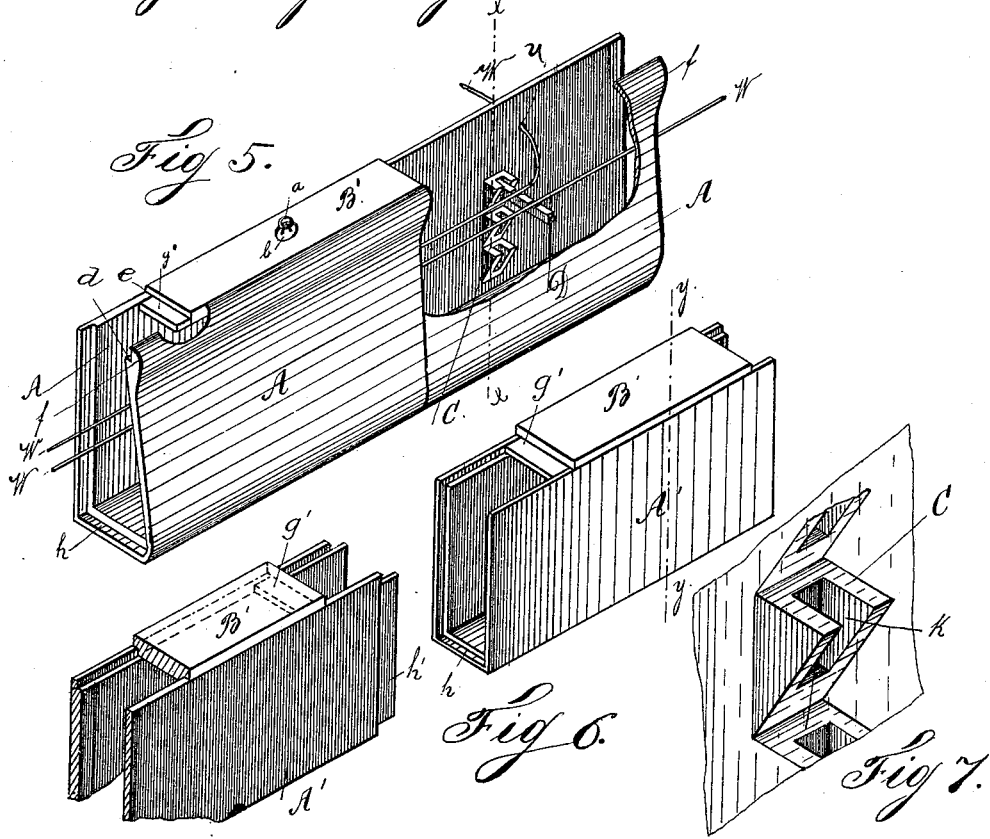

Figure 1 is a perspective view of our complete device and the manner of applying it upon ordinary streets, portions of the conduit being cut away to show the interior; Fig. 2, a vertical section through the curb-conduit, on the line $x$ $x$ of Fig. 6; Fig. 3, a like section through a crossing-section of the conduit on the line $y$ $y$ of Fig. 7; Fig. 4, a perspective view of the under side of a cover; Fig. 5, a perspective view of two sections of curb-conduit, the side of one being partly broken away; Fig. 6, a similar view of two crossing-sections; and Fig. 7, a detail view, in perspective, of one of a series of projections upon the interior of the curb.

A is a cast-iron section of the hollow curb, adapted to be placed between the foot-walk S and street-pavement T in lieu of the ordinary curbstone. $f$ is an enlargement or thickened portion along the top of the street side of the curb, to allow for the wear and tear caused by carriage-wheels coming in contact therewith. Each section is provided at one end with an internal rabbet, $h$, and at the opposite end with a correspondingly-shouldered flange, $h'$, for entering said rabbet, and forming a lap-joint and rendering the conduit practically continuous. In the upper edge of the outer side of the curb there is a rabbet, $d$, adapted to receive the edge of the cover B'. $e$ is a lap-joint at the opposite side. The ends of the covers are united by means of laps $g$ and $g'$, which form lap-joints when the ends of the covers are brought together.

A series of projections, C, are cast upon and integral with the inner sides of the sections. These may be placed any suitable distance apart. By casting these projections integral with the curb the expense of riveting, welding, or bolting is avoided.

Lateral supports D, having depressions D' in their upper surface for the reception of the conductors W, are removably supported upon the projections C in the sockets K.

For convenience in removing the covers, a ring or handle, $a$, is provided. These rings are preferably seated in a depression, $b$, in the upper side of the cover.

A' is a section of the conduit adapted for street-crossings, the cover being secured by means of lap-joints on both sides and both ends.

Having thus described our invention, what we claim, and desire to secure by Letters Patent, is—

The combination, in a conduit for electrical conductors, of a hollow curb provided with a cover united thereto by means of a rabbet in one side and a lap-joint on the other, a series of projections upon the interior of said curb, and removable supports upon such projections, said supports having depressions therein for holding the conductors, substantially as described.

In testimony whereof we affix our signatures in presence of two witnesses.

HENRY L. CAPLES.
WILBER W. LEWIS.

Witnesses:
OTTO BECKENBACH,
HENRY D. ASHLEY.